Oct. 13, 1970  P. A. MASON  3,533,191
PROFILE GRINDING MACHINES
Filed Nov. 14, 1967  5 Sheets-Sheet 3

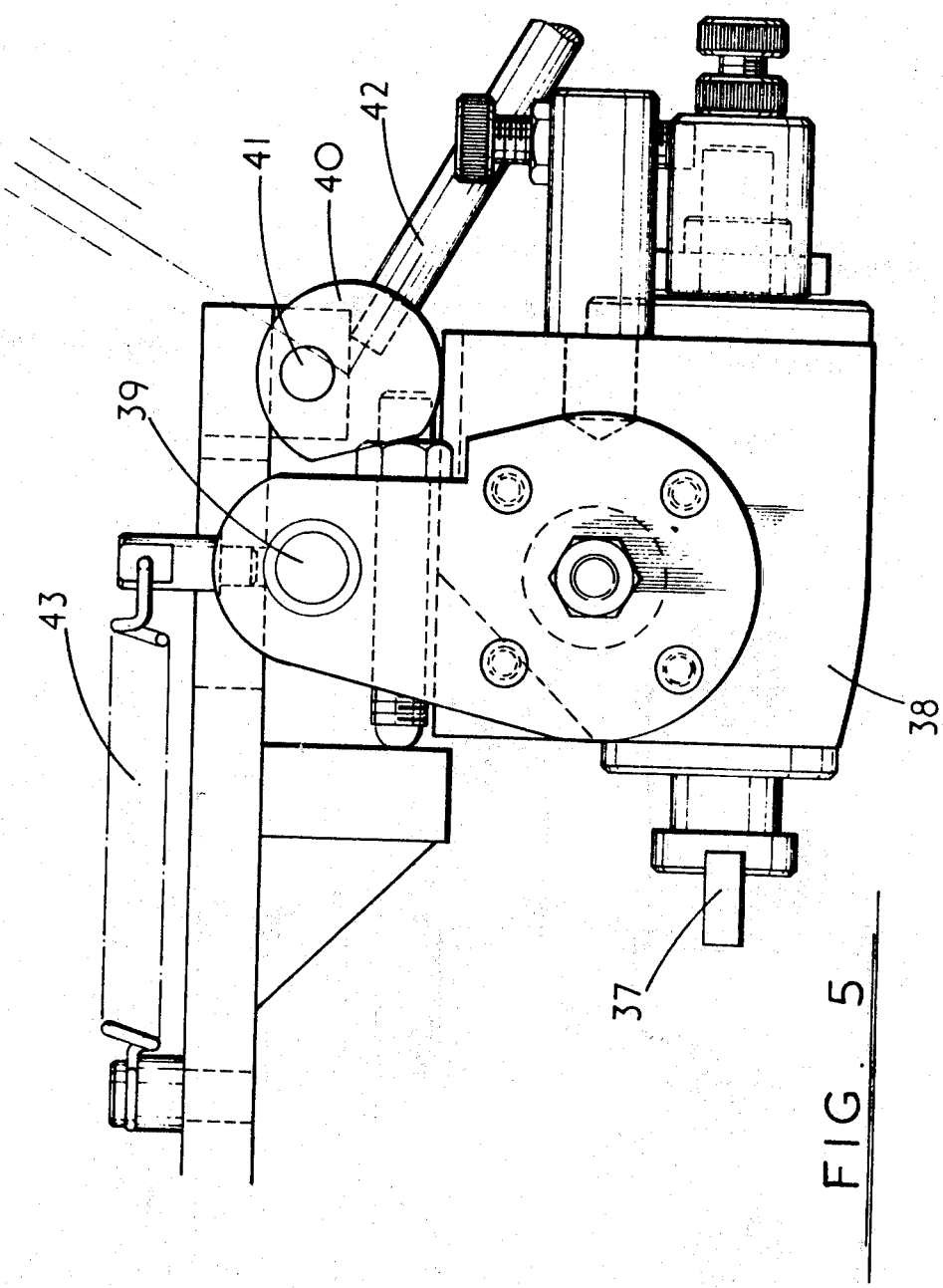

United States Patent Office 3,533,191
Patented Oct. 13, 1970

3,533,191
PROFILE GRINDING MACHINES
Peter Alan Mason, Kenilworth, England, assignor to Wickman Machine Tool Sales Limited, Coventry, England, a British company
Filed Nov. 14, 1967, Ser. No. 682,780
Claims priority, application Great Britain, Nov. 18, 1966, 51,779/66
Int. Cl. B24b 7/00, 9/00
U.S. Cl. 51—34                                6 Claims

ABSTRACT OF THE DISCLOSURE

A profile grinding machine in which the grinding wheel and workpiece are mounted upon assemblies permitting relative movement to produce, with reciprocation of the grinding wheel, a regular or irregular profile upon the workpiece, has additional means for moving the grinding wheel towards the workpiece to compensate for wear and bodily in a direction transverse with respect to the direction towards the workpiece, and means for adjusting the workpiece support assembly so that in use its periphery always passes, during its reciprocatory movement, through a fixed point coincident with the top surface of the workpiece.

This invention relates to grinding machines of the kind having a rotatably mounted grinding wheel which, as a result of relative movement between the wheel and a workpiece, is capable of producing a desired regular or irregular profile upon the workpiece, the grinding wheel being moreover adjustable for front and side clearance, that is adjustment about two mutually perpendicular axes.

The object of the invention is to produce a profile grinding machine of this kind in a convenient form.

In accordance with the present invention, a profile grinding machine of the kind specified comprises a grinding wheel support assembly and a workpiece support assembly, the grinding wheel support assembly being additionally arranged to adjust the grinding wheel towards the workpiece to compensate for wear upon the wheel, angularly about a vertical axis, and bodily in a horizontal direction which is transverse with respect to the direction of movement towards the workpiece, the workpiece support assembly being movable relatively to the grinding wheel support assembly in two mutually perpendicular horizontal planes and also vertically, the grinding wheel support assembly has means for adjustment whereby, in use, as the grinding wheel is moved relatively to a workpiece, its periphery always passes through a fixed point.

Preferably the machine is automatically controlled so that the workpiece support assembly is manipulated relatively to the grinding wheel in accordance with a predetermined programme and the grinding wheel support assembly is adjusted also in accordance with the programme.

There is also conveniently provided means for dressing the wheel at predetermined intervals.

Figure 1:
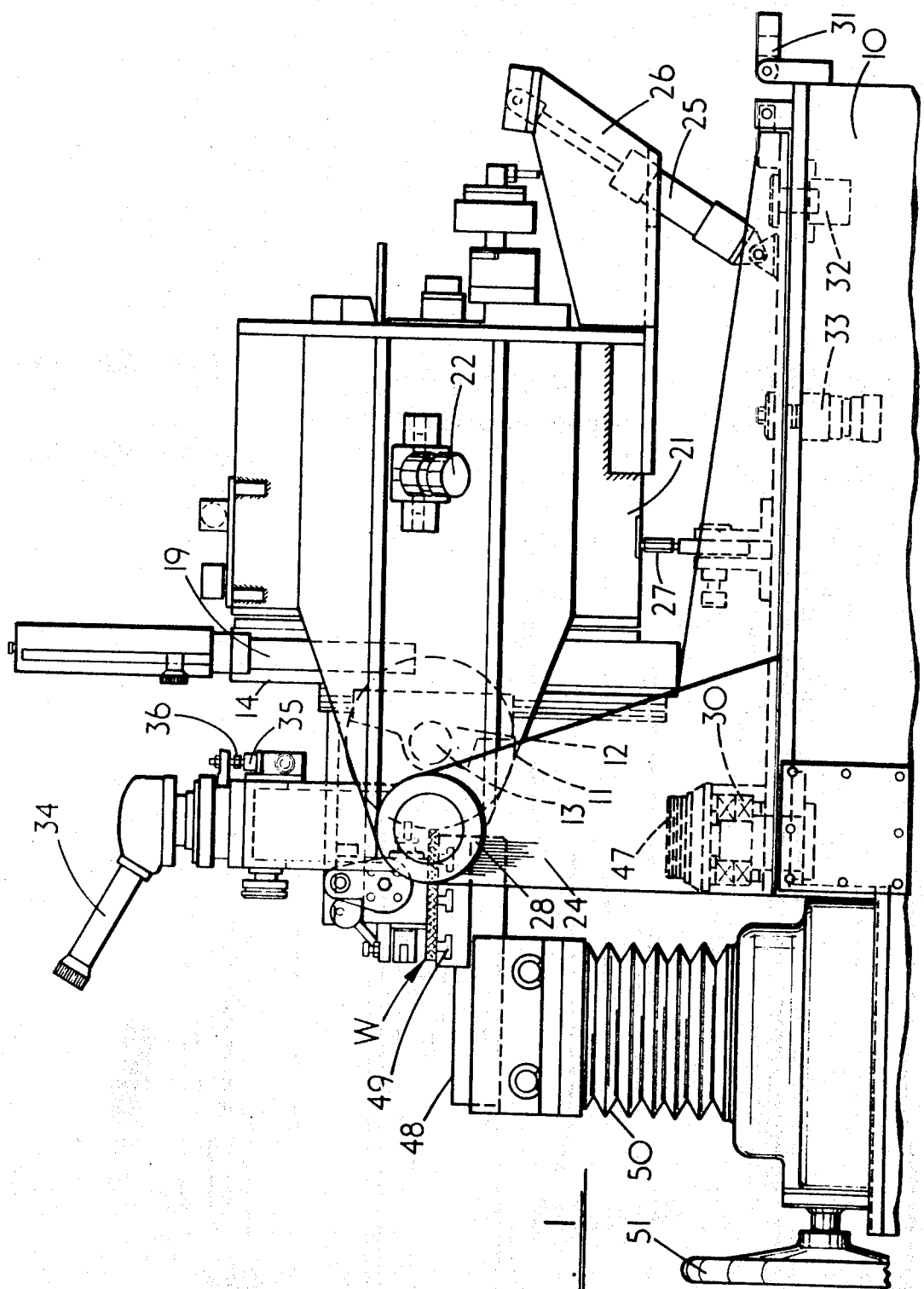

The invention will now be described by way of example with reference to the accompanying drawings in which:
FIG. 1 is a side elevation view of a profile grinding machine constructed in accordance with the invention,
FIG. 2 is a front view of the machine,
FIG. 3 is an enlarged exploded perspective view of certain of the parts of the grinding wheel support assembly of the machine,
FIG. 4 is a detail view showing the grinding wheel head, and
FIG. 5 is a detail view illustrating the wheel dressing mechanism.

Figure 2:
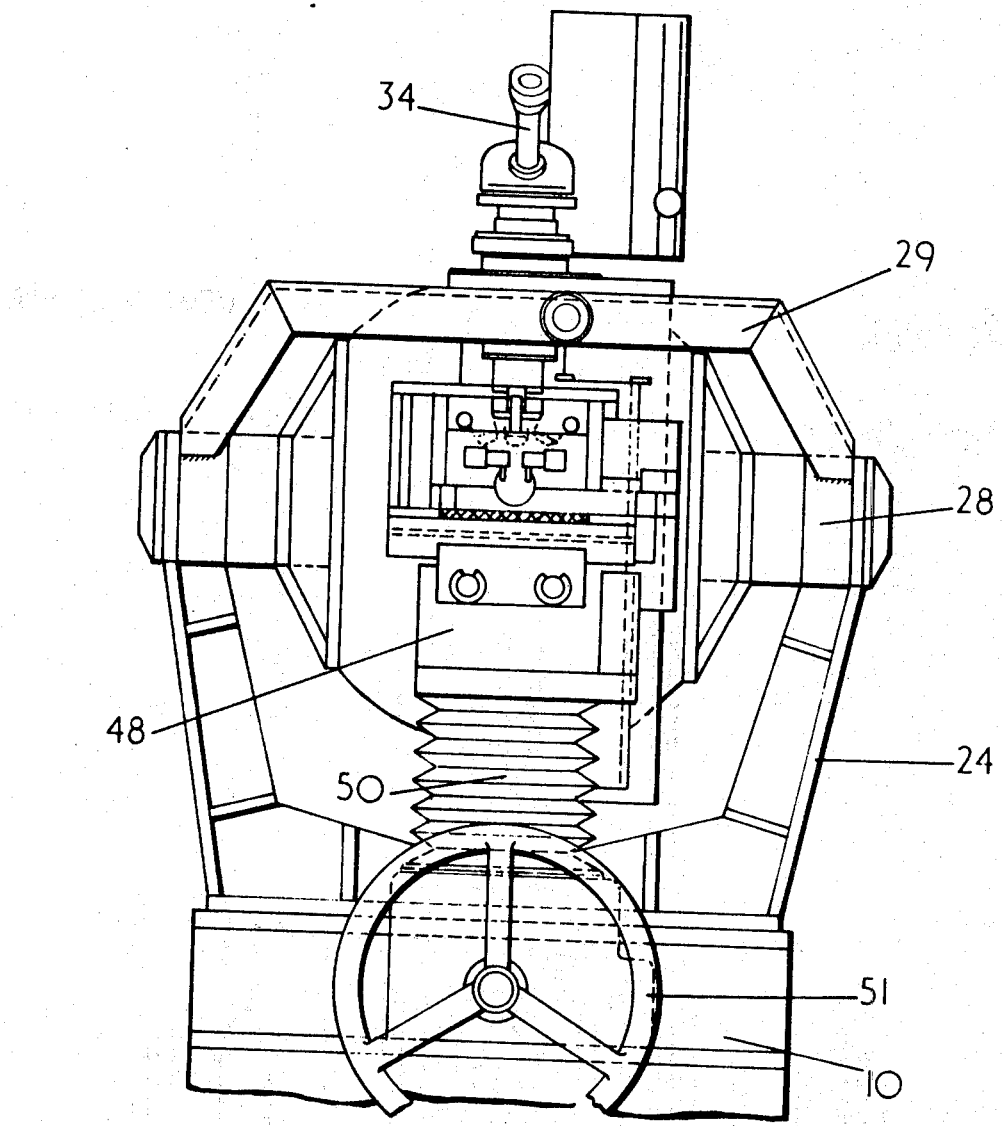
Figure 3:
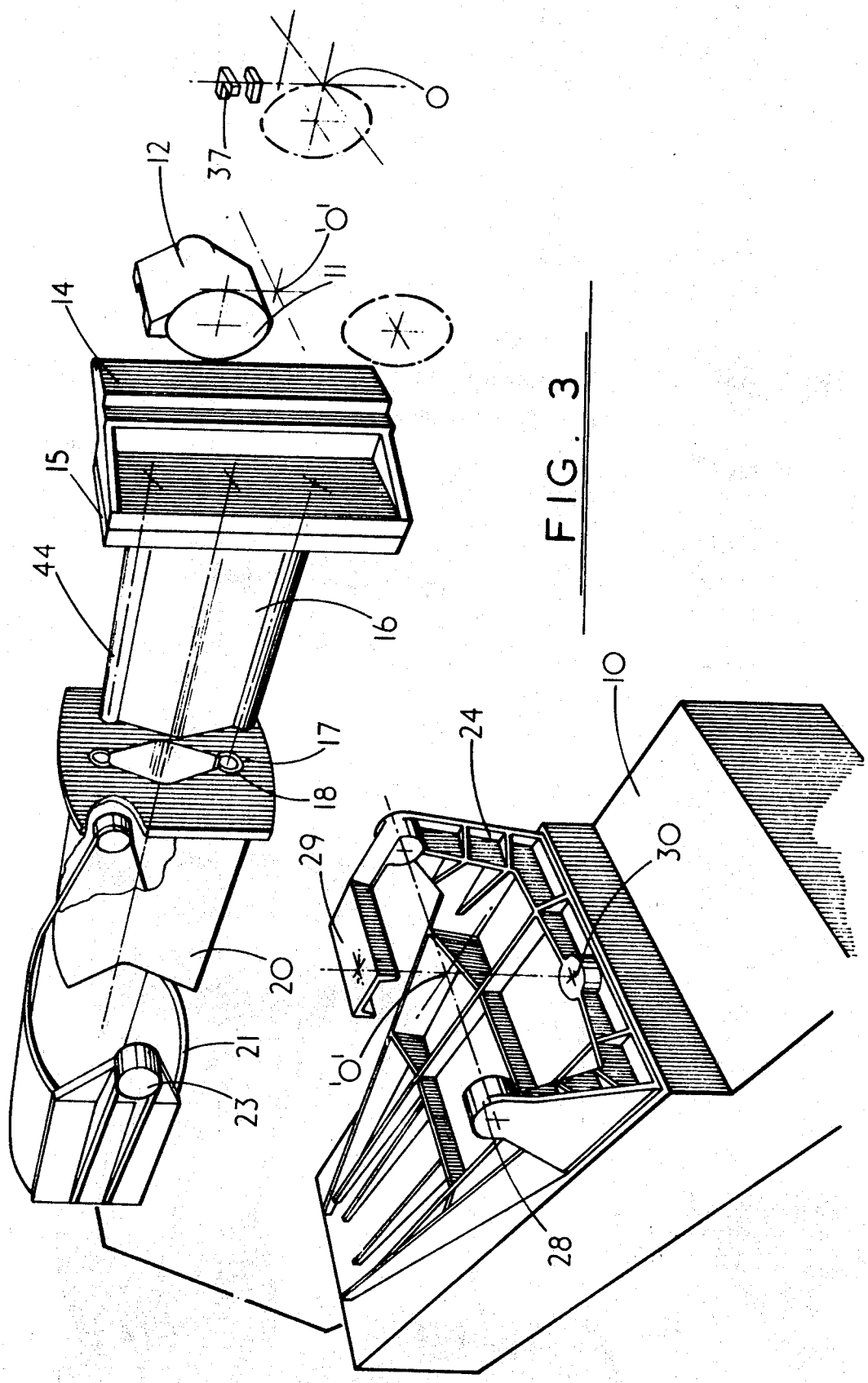
Figure 4:
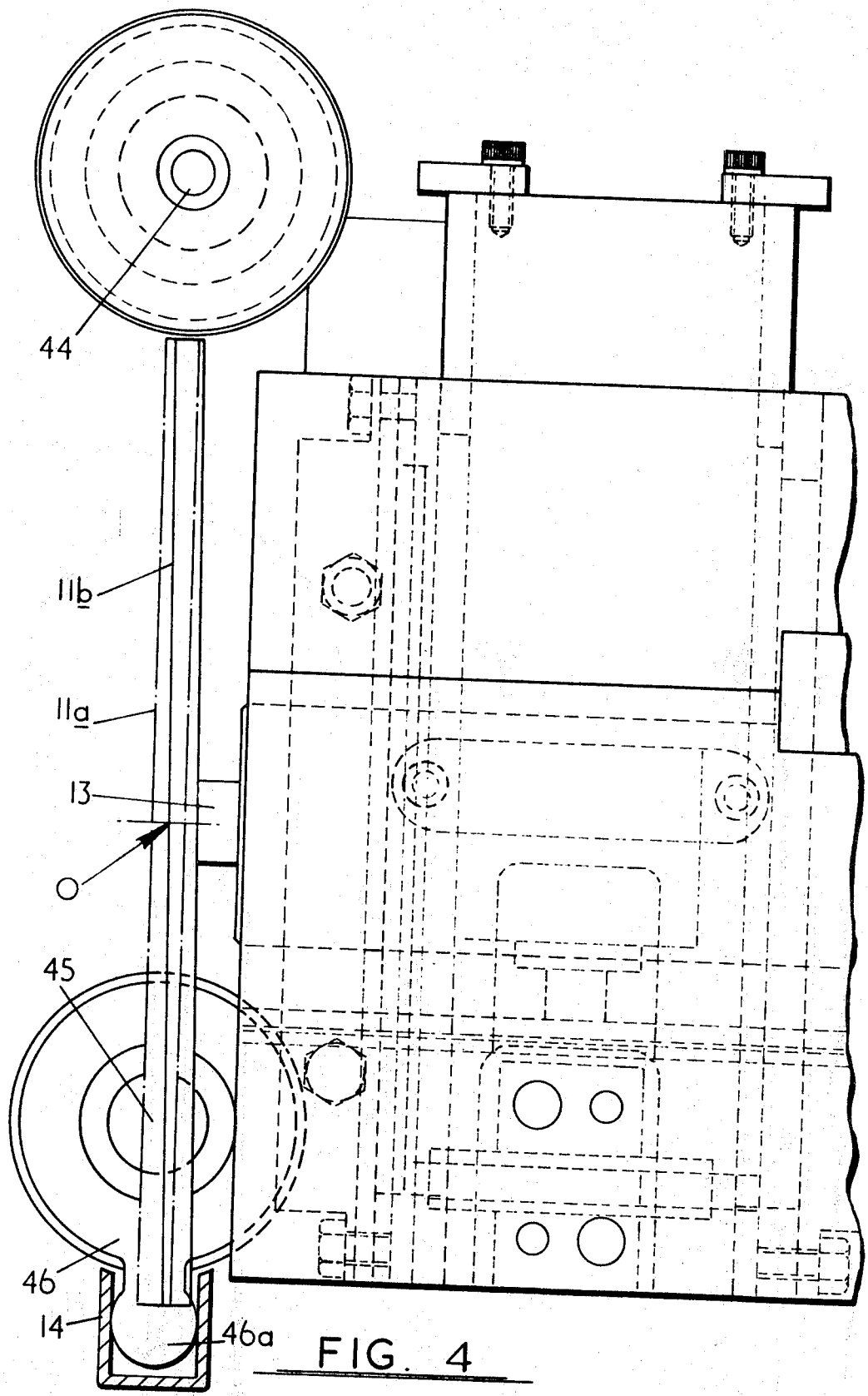

With reference to FIGS. 1, 2 and 3, the machine comprises a base 10 upon which are supported a grinding wheel support assembly and a workpiece support assembly.

The grinding wheel 11 is mounted upon suitable structure whereby it can be rotated, and also reciprocated in a normally substantially vertical plane. The workpiece support assembly carries a workpiece indicated at W and is capable of adjustment in a plurality of planes, and in this example the operation of the machine is controlled to a predetermined program from a punched tape through a suitable mechanism of generally known kind (not shown).

The grinding wheel support assembly is also capable of adjustment in a number of directions, and for this purpose, the grinding wheel 11 is mounted upon a grinding wheel head 12 through a shaft assembly indicated at 13. The shaft assembly has a variable speed and has a hydraulic drive motor incorporated in it, so that changes in speed of rotation of the grinding wheel 11 can be achieved, so that the peripheral speed thereof remains substantially unchanged, despite diameter changes as wear and dressing takes place. The axis of the grinding wheel spindle assembly is normally horizontal and the grinding wheel head 12 is mounted for reciprocating movement upon a slide 14 mounted on a part 15, the slide extending normally with respect to the grinding wheel spindle axis, and therefore being normally substantially vertical.

The part 15 has a portion 16 of generally diamond cross-section, as illustrated in FIG. 3 extending rearwardly, that is away from the grinding wheel 11, this portion 16 being slidably mounted in a side clearance housing 17 through part-cylindrical shaped slides 18. Moreover mounted upon the part 15 is a hydraulic cylinder 19 which is arranged to reciprocate the grinding wheel housing 12 together with the grinding wheel 11.

The part 15 defines an internal cylinder in which is slidably mounted a piston (not shown) fixed to the side clearance housing 17. If an adjustment of the position of the part 15 is to be accomplished, hydraulic fluid is admitted to an appropriate end of this cylinder. Adjustment of the part 15 is necessary so that the grinding wheel periphery always passes through a predetermined fixed point, indicated at O in FIG. 3, despite changes in its diameter, resulting from dressing of the wheel. There is an electrical transducer which provides a signal related to wheel diameter, this signal being used to control admission of hydraulic fluid for moving the part 15 forwardly by the required amount. The side clearance housing 17 has a rearwardly extending portion 20 the cross-section of which includes two arcs separated by two generally V-shaped portions as will be seen from FIG. 3. The two part-cylindrical surfaces of the portion 20 engage in respective bearing portions (not shown) mounted in a hollow front clearance housing 21, so that arcuate movement between the side clearance housing and the front clearance housing can be achieved. By means of such movement, the grinding wheel rotational axis can be tilted out of the horizontal, such movement being referred to as side clearance. In FIG. 1 is illustrated one of a set of hydraulic operating cylinders 22 acting between the side clearance housing 17 and the front clearance housing 21, there being means also for locking the parts in any selected position.

The front clearance housing 21, is in the form of a hollow part cylinder with two flat sides, which extend to provide a pair of co-axial trunnions 23, whereby the front clearance housing 21 is mounted in an attitude platform 24. The front clearance housing 21 may be adjusted about the trunnion axes, this axis passing through the point O as seen in FIG. 3. Such movement of the housing 21 causes the slide 14, upon which the grinding wheel head 12 is mounted, to be moved out of the vertical, such movement being referred to as front clearance. In order to achieve front clearance adjustment, there is provided an hydraulically operated cylinder 25 connected at one end to the attitude platform 24 and at the other end to a rearward extension 26 of the front clearance housing 21. Beneath the front clearance housing 21 is an adjustable stop 27 which is in the form of a disc carrying a number of radial extensions of differing length, there being electrically operated means for rotating the disc through the appropriate angle to bring a required radial extension into a position to engage with the front clearance housing 21, so that the desired front clearance angle is achieved when the cylinder 25 is actuated, so that the front clearance housing 21 is brought to rest upon the stop 27. With this arrangement the number of possible front clearance angles is the same as the number of radial extensions on the disc of the adjustable stop 27.

The attitude platform 24 upon which the front clearance housing 21 is mounted is illustrated in FIG. 3, and has a pair of upstanding arms upon which are formed respective bearings 28 engageable with the trunnions 23 of the front clearance housing, and extending between these bearings 28 is a bridge 29. The attitude platform has rearwardly extending limbs, and is pivotally mounted upon the base 10 about the vertical axis of a bearing 30. The axis of the bearing 30 if produced, passes through the point O and crosses the axis of the trunnion bearings 28 at this point.

The attitude platform is angularly adjustable about the axis of the bearing 30, but can be latched in a normal mid-position by means of a latch device 31 seen in FIG. 1. The latch device 31 is merely a pivotally mounted arm which engages with portions provided at the rearward extremity of the attitude platform, but can be moved as shown in FIG. 1 out of engagement with the attitude platform, so as to permit this to be moved angularly by means of a mechanism indicated generally at 32, there being an hydraulic locking device 33 whereby the attitude platform 24 can be secured in a selected position on either side of the mid-position.

Mounted upon the bridge 29 of the attitude platform 24 is a microscope 34 for viewing the work, and also for viewing the dressing device to be described. The microscope is, for this purpose, mounted so as to be vertically adjustable so that the work can be brought into focus when the microscope is in its lower position, and the dressing device can be brought into focus at its higher position. It is however important that the microscope shall be retracted upwardly when the machine is in operation so that the grinding wheel 11 is not fouled by the lower part of the housing of the microscope 34, as it reciprocates on its substantially vertical slide. In order to ensure that the machine will not operate if the microscope 34 is in its lowered position, there is provided a micro-switch 35 which is engaged by a stop 36, the latter being carried by the microscope 34, and the former being mounted upon the bridge 29.

Mounted upon the side clearance housing 17 is the dressing device which is illustrated in FIG. 5. This includes a diamond impregnated or similar dresser 37 for the wheel which may be of any convenient shape as determined by the required shape of the peripheral edge of the grinding wheel, this dresser 37 being mounted within a housing 38 so as to be rotatable about an horizontal axis. The housing 38 is in turn mounted upon a bracket about the axis of a spindle 39, the bracket being mounted on the front face of the side clearance housing 17. A cam 40, which is also pivotally mounted on the bracket through a spindle 41, acts upon a part of the housing 38 of the dresser and is adjustable by means of a lever 42 between a position illustrated, in which the dresser is positioned so as to engage the grinding wheel 11 when the later travels sufficiently far along its slide 14 to pass the dressing device. The cam can also occupy another position in which the dresser is urged by a tension spring 43 out of engagement with the grinding wheel.

As illustrated in FIG. 4, the grinding wheel 11 can be moved bodily in a direction laterally with respect to the direction of forward travel of the part 15, part of such movement being achieved by relative movement between the slide 14 and the part 15. Such movement takes place about an horizontal axis 44 which is shown in FIGS. 3 and 4. The movement is achieved by angular movement of a shaft 46 carrying a lobe 46a about an axis 45. The shaft 46 is mounted in the part 15 and its lobe 46a engages a slot in the slide 14. Assuming that the grinding wheel 11 was initially vertical, as indicated by the rectangular 11a in FIG. 4, angular adjustment about the axis 44 will reposition the grinding wheel as indicated by the rectangle 11b. In order now to return the grinding wheel 11 to its vertical position, but off-set bodily from its original position, it is merely necessary to rotate the side clearance housing about the point O, so that the grinding wheel will take up a position which, in the example shown, the edge of the wheel coincides with the point O. This is distinguished from the initial position described in which the mid-point of the wheel with respect to its thickness, is coincident with the point O, as shown by the rectangle 11a in FIG. 4.

Coinciding with the axis of the microscope, which is also the axis of the bearing 30, is a lamp 47 which is housed in the same structure as the bearing 30, this being provided with a detachable green filter, and furthermore there is, beneath the microscope 34, means for illuminating the workpiece.

The workpiece support assembly is adjustable vertically as well as in two mutually perpendicular horizontal directions, one of which is towards and away from the grinding wheel, and the other laterally with respect thereto. The two horizontal slides whereby such adjustment can take place are indicated at 48 and 49 respectively. These are controllable by hydraulic actuators (not shown). The mechanism for vertical adjustment is housed within a bellows 50, and is controlled by a hand wheel 51 on this assembly. Vertical adjustment is ncessary so that whatever the depth of the workpiece the plane containing the point O always coincides with the top surface of the workpiece.

The machine is however operated through electronic mechanism (not illustrated) which includes a tape reading device of known kind, this apparatus being housed normally in a separate cabinet associated with the machine, and the arrangement being such that the workpiece support assembly is adjusted to produce upon the workpiece a desired profile, the electronic apparatus also including means for adjusting the grinding wheel support assembly in appropriate manner in accordance with a programme to produce the desired profile.

Operation of the machine is arranged so that the grinding wheel periphery always passes through the point O as it reciprocates, this point coinciding with the top surface of the workpiece. In use, the tape is provided with data enabling a predetermined profile to be formed on the workpiece. The electronic mechanism provides signals for actuating the workpiece support assembly adjustments to produce movements of the workpiece as the operation progresses so that the required profile is formed. The machine is arranged so that at the end of a predetermined number of cycles of the grinding wheel, the stroke of the latter will be increased so that it passes the dressing device, it being necessary for the part 15 to be moved forward by a predetermined amount. Dressing is however carried out before wear has taken place to the same stage, so that some material is removed from the grinding wheel at each dressing operation. With this arrangement, after forward movement of the part 15, dressing will always ensure that the grinding wheel periphery reaches a position in which it will pass through the point O. The point O is a referance point related to the tape control and it is essential that the grinding wheel always passes through this point and also that the point O coincides with the top surface of the workpiece since the tape is calculated to produce adjustment to the position of the workpiece relative to a fixed setting. Any deviations of the grinding wheel from the point O would change the relationship of the tape controlled adjustment from the reference setting and would thus produce an incorrect profile on the workpiece. When it is desired to set up the machine with the grinding wheel in the correct relationship to the workpiece, the microscope 34 can be used, but as previously referred to, this must be withdrawn before normal operation of the machine begins. Furthermore the microscope can be used in its alternative position for setting up the dressing device in relation to the path of the wheel, but during normal operation of the machine there is no necessity for viewing of the grinding wheel, workpiece or dressing device.

Should it be desired to form a profile in a workpiece of generally channel shape or other shape having oppositely and inwardly presented faces, it is necessary that the grinding wheel shall be inclined about a vertical axis by a convenient amount from its normal position, this being achieved by angular adjustmnt of the attitude platform 24. The grinding wheel will also be off-set in the manner described. There is provided, when such a operation is to be performed, a dressing device of right angular form, and having its two faces arranged rectilinearly with respect to the normal grinding wheel axis, that is the position of the grinding wheel illustrated at 11a in FIG. 4.

The dressing device will thus provide upon the grinding wheel in its off-set attitude, a peripheral portion and a side surface portion which are parallel to and normal to the axis of rotation of the grinding wheel when the latter is in its position indicated at 11a. One of the faces of the channel or other formation can be ground using these surface portions, the remainder of the grinding wheel being out of contact with the workpiece. When it is desired to grind the opposite face of the channel or other formation, the inclination of the grinding wheel is altered. The dressing device is also rotated through 180°, so that a new profile is formed upon the periphery and the other side face of the grinding wheel. It is however to be understood that inclination would not normally exceed 1° from the normal position.

It is to be understood that the machine may, if desired, be operated manually, in which case the microscope is necessary so that the operator can view the grinding operation, and furthermore, a known kind of pantograph copying system must be incorporated. The pantograph system incorporates a template and follower. The follower is operated manually and is connected through a linkage with the workpiece support assembly. The workpiece support assembly and not the grinding wheel support assembly must be guided in accordance with the pantograph template, but the pantograph must be connected to the workpiece supporting assembly, since as previously referred to the grinding wheel support assembly is so arranged that the grinding wheel periphery must always be maintained in a position in which its periphery passes through the point O.

When the machine is used automatically, the microscope only being used for viewing during setting up operations, a liquid coolant may be used, this being particularly desirable in providing good surface finish on grinding machines.

When manually operated, a liquid coolant cannot be used since it would obscure the view of the workpiece through the microscope.

Having thus described my invention what I claim as new and desire to secure by Letters Patent is:

1. A profile grinding machine comprising a base, a grinding wheel support assembly on the base and upon which a grinding wheel can be rotatably and reciprocably mounted, and a workpiece support assembly on the base, the grinding wheel support assembly having means for adjustment relatively to the workpiece support assembly in directions towards the workpiece, to compensate for wear upon the wheel, angularly about a vertical axis and bodily in a horizontal plane which is transverse with respect to the direction of movement towards the workpiece, adjustment means for moving the workpiece support assembly relatively to the grinding wheel support assembly in two mutually perpendicular horizontal planes, and also vertically, and the adjustment means of the workpiece support assembly being arranged such that, in use, as the grinding wheel reciprocates, its periphery always passes through a fixed point which is coincident with the top surface of a workpiece.

2. A profile grinding machine as claimed in claim 1 in which the grinding wheel support assembly has means for reciprocating the grinding wheel in a vertical plane.

3. A profile grinding machine as claimed in claim 1 in which there is means whereby the grinding wheel can be moved bodily in the direction of its axis of rotation about an axis which is spaced from the axis of rotation of the grinding wheel.

4. A profile grinding machine as claimed in claim 1 in which the grinding wheel support assembly carries a spindle assembly upon which the grinding wheel is intended to be mounted, the spindle assembly being driven by a variable speed hydraulic motor and having apparatus whereby the speed of the spindle assembly is varied in accordance with changes in the diameter of the grinding wheel.

5. A profile grinding machine as claimed in claim 1 having a tape control mechanism, means for reading data on the tape, actuating means for controlling the adjustment means on the workpiece support assembly, and signal transmitting means for transmitting signals from the tape reading means to said actuating means to control the position of the workpiece support assembly whereby the desired profile can be formed on the workpiece.

6. A profile grinding machine as claimed in claim 5 including means for dressing the grinding wheel and the means for moving the grinding wheel support assembly towards the workpiece is moved so that the dressed grinding wheel will always pass through said fixed point.

References Cited

UNITED STATES PATENTS

| 1,964,233 | 6/1934 | Uhlich | 51—45 X |
| 1,756,876 | 4/1930 | Orcutt et al. | 51—165.14 X |
| 3,080,686 | 3/1963 | Healy et al. | 51—165.14 X |
| 3,353,305 | 11/1967 | Wolf et al. | 51—45 X |
| 2,296,064 | 9/1942 | Silven | 51—45 X |

FOREIGN PATENTS 660,751  6/1938  Germany.

JAMES L. JONES, JR., Primary Examiner